United States Patent [19]

Hashimoto

[11] Patent Number: 4,525,600

[45] Date of Patent: Jun. 25, 1985

[54] AUTOMATIC TELEPHONE ANSWERING DEVICE

[75] Inventor: Kazuo Hashimoto, Tokyo, Japan

[73] Assignee: Hashimoto Corportion, Tokyo, Japan

[21] Appl. No.: 471,214

[22] Filed: Mar. 1, 1983

[30] Foreign Application Priority Data

Mar. 5, 1982 [JP] Japan .................................. 57-34747

[51] Int. Cl.³ .......................................... H04M 11/00
[52] U.S. Cl. ................................................ 179/6.02
[58] Field of Search ..................... 179/6.01, 6.02, 6.03,
179/6.15, 6.11, 6.20, 6.17, 18 BE, 27 FH

[56] References Cited

U.S. PATENT DOCUMENTS

| | | | |
|---|---|---|---|
| 3,728,486 | 4/1973 | Kraus .................................. | 179/6.17 |
| 4,356,519 | 10/1982 | Codgell, Jr. ......................... | 179/6.03 |
| 4,408,100 | 10/1983 | Pritz et al. ......................... | 179/27 FH |

FOREIGN PATENT DOCUMENTS 0046623  3/1982  European Pat. Off. ........... 179/6.17

*Primary Examiner*—Donald McElheny, Jr.
*Attorney, Agent, or Firm*—Lowe King Price & Becker

[57] ABSTRACT

An automatic telephone answering device is proposed wherein a specific signal such as a speed calling or paging signal which is prestored in an outgoing message tape and which follows a short outgoing message is reproduced to allow an unidentified third party to hear the specific signal and to leave a message with confidence and without hanging-up immediately when he makes a telephone call and realizes that the call has been received by the automatic telephone answering device. When he finishes recording his message on an incoming message tape and hangs up the telephone, the device automatically calls up the subscriber as the caller expected.

5 Claims, 3 Drawing Figures

AUTOMATIC TELEPHONE ANSWERING DEVICE

BACKGROUND OF THE INVENTION

The present invention relates to an automatic telephone answering device.

In a conventional automatic telephone answering device (TAD), an unidentified third party (customer) often hangs up the telephone upon immediately realizing that his or her call is connected to the automatic telephone answering device. As a result, effective use of the function of the automatic telephone answering device is prevented. There are several reasons why this happens. First, there is the fact that a caller (customer) is reluctant to be answered by a machine unexpectedly when he makes a telephone call. Moreover, a second reason why the caller immediately hangs up the telephone upon realizing that his call is connected to the automatic telephone answering device, even if he actually has a message to be left, is as follows. Even if the caller leaves his message on the conventional automatic telephone answering device, he has no means of knowing when the message will be delivered to the called party or the subscriber or when he will receive any action from him. Accordingly, in the above case, the caller would choose someone else with whom he can access and talk directly. This narrows the application and the effective use of the automatic telephone answering device. As a result, it is an urgent problem how to shorten the access time required to reach the subscriber in order to meet the needs of customers. In view of the above problem, the present application has been proposed to solve the inconvenience of a conventional automatic telephone answering device.

SUMMARY OF THE INVENTION

It is a first object of the present invention to provide an automatic telephone answering device wherein a specific signal such as a speed calling signal or a paging signal is stored in an outgoing message tape together with a prerecorded message and wherein an automatic dialling function of the device is notified in advance to the caller by reproducing and delivering the specific signal so that the caller may know, upon hearing the specific signal, that the message placed by him on the automatic telephone answering device may be given to the subscriber as soon as possible.

It is a second object of the present invention to provide an automatic telephone answering device wherein, when the first object of the present invention is attained, the specific signal such as the speed calling signal or the paging signal stored in the outgoing message tape can also be used as "beep" tones used in a conventional automatic telephone answering device, that is, as a signal used when switching occurs from the outgoing message tape to an incoming message tape.

It is a third object of the present invention to provide an automatic telephone answering device wherein the automatic dialling function is performed only when the incoming message tape is run and the caller might have recorded a message on that tape.

It is a fourth object of the present invention to provide an automatic telephone answering device wherein, if an unidentified third party makes a telephone call and immediately hangs up the receiver upon realizing that he is answered by the automatic telephone answering device, the device is restored to the standby mode but the automatic dialling function is disabled.

It is a fifth object of the present invention to provide an automatic telephone answering device wherein a loop circuit is automatically engaged through a test point by an external input signal such as an alarm signal at the time of an emergency or abnormal accident, and thereafter the automatic dialling function is enabled.

In order to attain the above-mentioned objects, in an automatic telephone answering device of the present invention, a specific signal such as a speed calling signal of a telephone number at which the subscriber can be reached or a paging signal is stored in the outgoing message tape. When a loop circuit is engaged by reception of an incoming call, the automatic telephone answering device drives the outgoing message tape, plays and delivers the above-mentioned specific signal followed by the prerecorded message, and thereafter, drives an incoming message tape so that the caller may record his message on the incoming message tape. When the caller hangs up the receiver, the loop circuit of the telephone line is disengaged. A means for reengaging the loop circuit is operated so that the loop circuit is reengaged. Dial tone detecting means then detects a dial tone transferred from a telephone exchange, the outgoing message tape is rerun, and the specific signal stored in the outgoing message tape is transmitted, thereby calling the subscriber. The subscriber receives the call at a remote location and can remote-listen to the message recorded on the incoming message tape by means of a well-known retrieval function of the TAD. In the manner described above, the caller can hear from the outgoing message tape the playback or reproduced sound of a speed calling signal of the telephone number at which communication can be made with the subscriber later. As a result, the caller can appreciate that his message will be delivered to the subscriber as soon as possible and can with confidence leave his or her message, thereby fully utilizing the function of the automatic telephone answering device. Moreover, in the automatic telephone answering device of the present invention, the speed calling signal of the telephone number at which the subscriber can be called can replace a so-called single "beep" tone which persuades the recording of the caller's message on the incoming message tape.

In addition, the automatic telephone answering device according to the present invention transmits a specific signal to the subscriber or pages the subscriber only when the incoming message tape starts running, so that the caller's message may be expected to be passed on to the subscriber. When a call is received, the outgoing message tape starts running, and, if the receiver is hung up before the incoming message tape starts running, the specific signal is not transmitted to the subscriber, thus preventing the wasteful incurrence of telephone charges.

DETAILED DESCRIPTION OF THE PREFERRED EMBODIMENT

Figure 1:
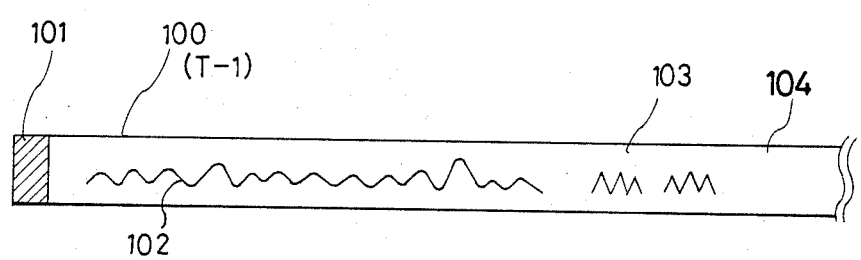
FIG. 1 is a view showing a recorded state of an outgoing message tape used in an embodiment of the present invention.

FIG. 1 shows a recorded state of an outgoing message tape T-1 used in an automatic telephone answering device according to the present invention. Reference numeral 100 denotes the outgoing message tape T-1; 101, a conductive tab attached to an end point of the outgoing message tape; and 102, a prerecorded message, for example, a comment "This is Hashimoto Corporation. We are sorry there is nobody here at the moment. The answering machine will record your message. After the tones, please leave your message." is recorded. Reference numeral 103 denotes a specific signal such as a speed calling signal or a paging signal of two or three digits, that is, a stored signal of a predetermined telephone number at which the subscriber can be reached by means of performing an automatic dialling function to be described later. However, if the prerecorded message 102 continues for $t_1$ (different in various countries) seconds or longer, a signal representing that the line is busy will be generated by the telephone exchange after the outgoing message tape T-1 is restarted in a manner described later, thereby disabling the performance of the automatic dialling function of the specific signal. In this case, the tape portion carrying the prerecorded message 102 is divided into a first half and a second half, and the specific signal 103 is interposed therebetween, while known "beep" tones can be used as switching means for switching to the incoming message tape at the end of the outgoing message tape. Reference numeral 104 denotes a nonrecorded blank portion.

Figure 2A:
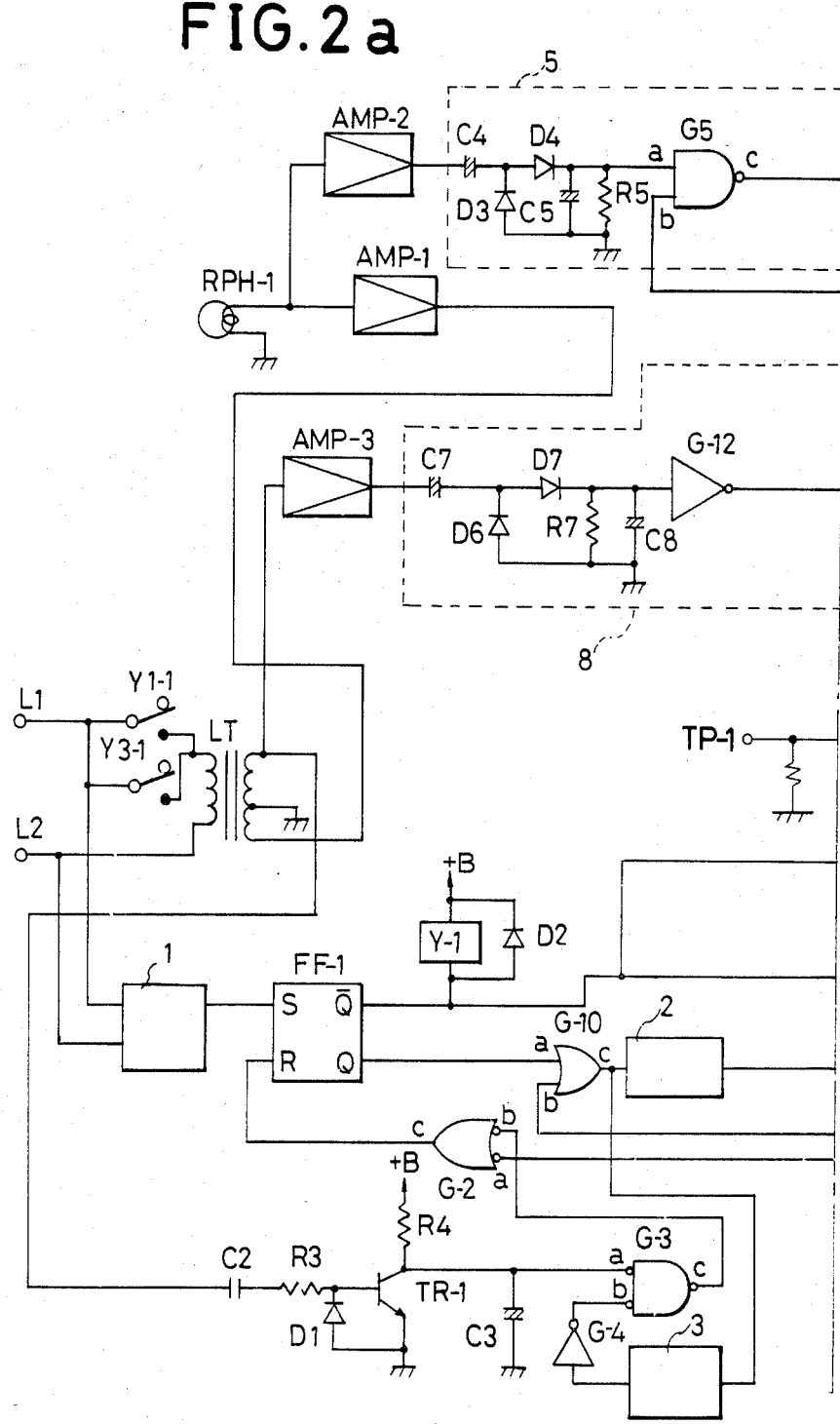
FIGS. 2a and 2b are a circuit diagram of an automatic telephone answering device according to an embodiment of the present invention.
Figure 2B:
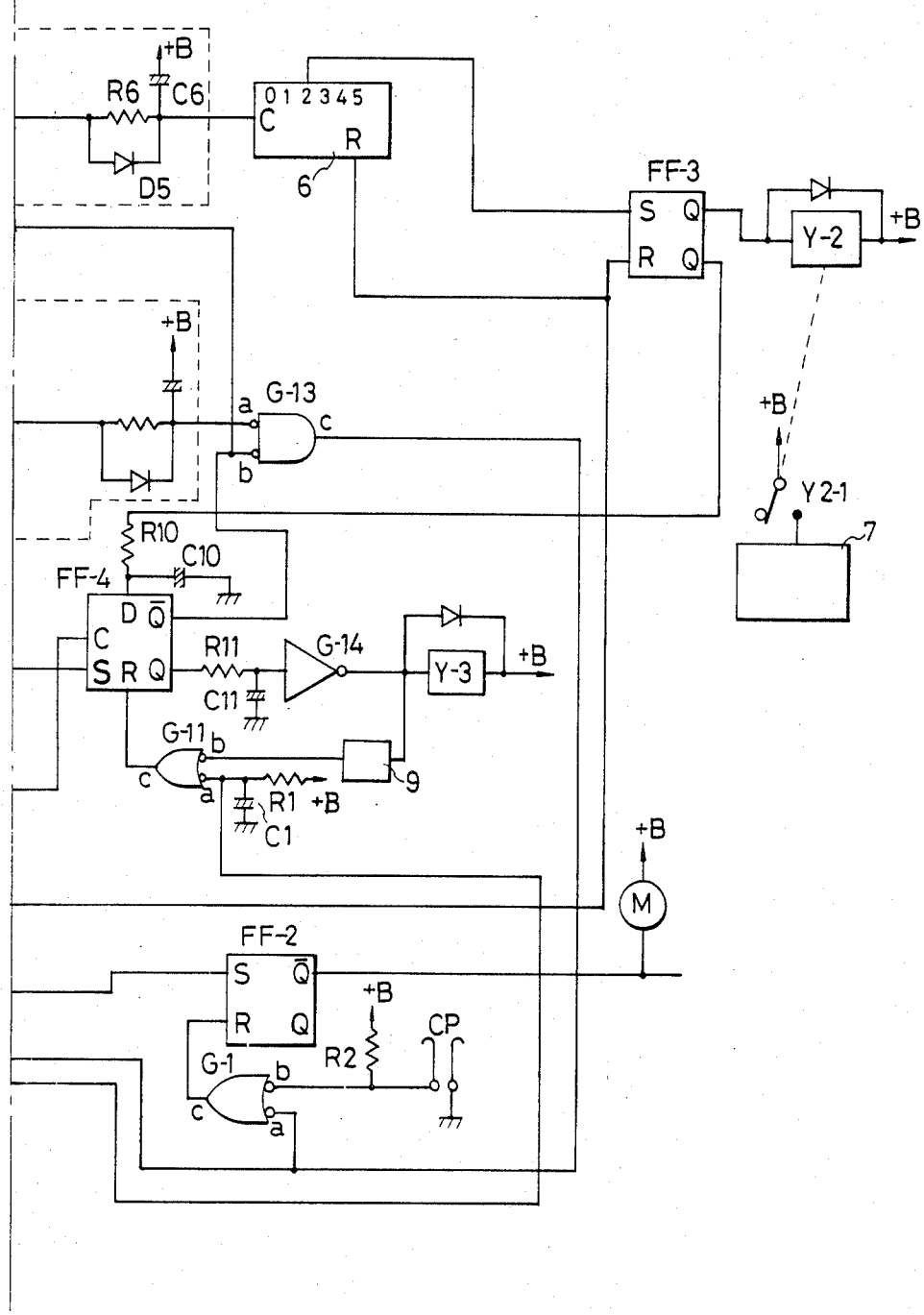

FIGS. 2a and 2b are a circuit diagram of an automatic telephone answering device according to an embodiment of the present invention. Reference symbols L1 and L2 denote telephone lines; LT, a line transformer; reference numeral 1, a ringing amplifier for detecting a ringing signal from the telephone lines L1 and L2; reference symbol FF-1, a flip-flop for biasing a loop relay Y-1 and which is set by an output from the ringing amplifier 1; 2, a differentiation circuit into which a set signal is supplied through an OR gate G-10 when the flip-flop FF-1 is set, and from which a pulse continuing for about one second is generated; and FF-2, a flip-flop which is set in response to the pulse from the differentiation circuit 2, which drives a DC motor M for driving the outgoing message tape T-1, and which, together with the flip-flop FF-2 and the DC motor M, constitutes means for driving the outgoing message tape T-1. Reference symbol CP denotes an electrode which is short-circuited by the conductive foil 101 on the outgoing message tape T-1. A marker of another type may be used in place of the electrode CP. Capacitors C2 and C3, resistors R3 and R4, a transistor TR-1, a NAND gate G-3, and so on, constitute a momentary release detection circuit which detects a pulse produced onto the telephone line when the caller hangs up the receiver and restores the automatic telephone answering device to the standby mode from the operating mode. Reference numeral 3 denotes a delay circuit for preventing erratic operation of the momentary release detecting circuit, comprising the transistor TR-1 and so on from occurring in response to a dummy pulse produced when the loop circuit of the device is engaged, reference symbol G-4 denotes an inverter; RPH-1, a recording/playing head for the outgoing message tape T-1; AMP-1, an amplifier for the prerecorded message; AMP-2, an amplifier for the specific signal 103; and reference numeral 5, a signal sound detecting circuit for discriminating from the prerecorded message and seperately producing the specific signal 103. Reference numeral 6 denotes a counter for counting a DC output of the specific signal 103. In this embodiment, a terminal 2 of the counter 6 goes high when the counter value is 2, that is, when all of a speed calling signal 103 consisting of two digits and comprising the specific signal is transmitted onto the telephone line. Reference symbol FF-3 is a recording flip-flop which is set in response to an output of high level from the terminal 2 of the counter 6 and which constitutes, together with the counter 6, switching means for switching from the outgoing message tape T-1 to the incoming message tape. Reference symbol Y-2 denotes a recording relay which is driven by the flip-flop FF-3; and reference numeral 7, a known recording device which is driven by a contact of the relay Y-2 for recording the voice of the caller.

A flip-flop FF-4 serves as a paging flip-flop which is set when the recording operation is completed and the automatic telephone answering device is restored from the recording mode (a state where the flip-flop FF-3 is set) to the standby mode (a state where the flip-fop FF-1 is reset). A relay Y-3 serves as a loop relay driven by an output from the flip-flop FF-4 through an inverter G-14 in order to perform paging. Reference numeral 9 denotes a timer which is driven by an output from the inverter G-14. The flip-flop FF-4, the inverter G-14, the relay Y-3, the timer 9, and so on constitute means for reengaging the loop circuit. The timer 9 serves, for example, as a 30-second paging timer. When the timer 9 goes OFF, the flip-flop FF-4 is reset through a gate G-11. Reference numeral 8 denotes means for detecting a dial tone produced when the loop circuit is engaged by a contact y3-1 of the relay Y-3; and reference symbol G-13, a NAND gate which produces a signal of high level when the flip-flop FF-4 is set and the dial tone is supplied. The OR gate G-10 produces a signal of high level in response to one of the outputs from the NAND gate 13 or the flip-flop FF-1 which is set upon receiving a call from an unidentified caller. When the output of the OR gate G-10 goes high, it drives the outgoing message tape T-1, through the flip-flop FF-2 and the motor M. Reference symbol G-5 denotes a NAND gate which prevents the travel of the incoming message tape while the flip-flop FF-4 is set and the outgoing message tape T-1 is being played. Furthermore, reference symbol C10 denotes a capacitor which serves as means for storing information indicating that the incoming message tape has been driven.

A terminal TP-1 in FIG. 2(a, b) is a test point for testing a means for reengaging a loop circuit. When a test signal (external signal) of high level is supplied to the terminal TP-1, the flip-flop FF-4 is set through its set terminal S. The inverter G-14, the relay Y-3 and the timer 9 are operated in the same manner as described above.

The automatic telephone answering device of the present invention has the configuration as described above. When a power source of the device is turned on, the flip-flops FF-1, FF-2 and FF-4 are reset by the delay circuit constituted by the resistor R1 and a capacitor C1. Meanwhile, the flip-flop FF-3 and the counter 6 are reset by an output $\overline{Q}$ of high level from the flip-flop FF-1. When a ringing is received at the terminals L1 and L2 under this condition, it is detected by the known ringing amplifier 1, and the flip-flop FF-1 is set by the output from the ringing amplifier 1. Then, the relay Y-1 is actuated by the output $\overline{Q}$ of high level from the flip-flop FF-1, and the loop circuit is engaged by a contact y1-1 and the line transformer LT of the relay Y-1, thus stopping the ringing, and the automatic telephone answering device is set to the operating mode. Simultaneously, an output Q of high level from the flip-flop FF-1 is supplied to the differentiation circuit 2 through the OR gate G-10, a pulse having a pulse width of about one second is produced by the differentiation circuit 2, and the flip-flop FF-2 which serves as means for driving the outgoing message tape is set. As a result, the DC motor M is turned on by the output $\overline{Q}$ of low level from the flip-flop FF-2 and starts driving the outgoing message tape T-1 shown in FIG. 1. At this time, the prerecorded message 102, for example, "This is Hashimotos . . . " recorded on the outgoing message tape T-1 is played by the recording/playing head RPH-1, amplified by the amplifier AMP-1, applied to the secondary side of the line transformer LT, induced by the primary side and then delivered to the caller through the telephone lines L1 and L2.

Thereafter, the specific signal 103, comprising the speed calling signal having two digits (in some countries, three digits), is reproduced. The playback signal is also applied to the line transformer LT and is delivered to the caller through terminals of the telephone lines L1 and L2.

Meanwhile, the specific signal 103, comprising the speed calling signal, is amplified by the amplifier AMP-2 and is supplied to the signal sound detecting circuit 5. More specifically, it is rectified by diodes D3 and D4, is smoothed by a capacitor C5, and raises the voltage supplied to one terminal a of the NAND gate G-5 to high level. At this time, since a high-level output $\overline{Q}$ from the flip-flop FF-4 which reengages the loop cirucit is supplied to the other input terminal b of the NAND gate G-5, an output from the NAND gate G-5 goes low. Thereafter, a capacitor C6 is gradually charged through a resistor R6 to a predetermined voltage level within about one second. Then, a clock terminal C of the counter 6 goes low. The counter used in this device counts one when the clock terminal C goes from low to high level. As a result, the counter 6 counts one every time a one-digit signal of the speed calling signal is reproduced. When the specific signal 103 comprising the speed calling signal having two digits is reproduced, an output from the terminal 2 of the counter 6 goes high and sets the recording flip-flop FF-3. The recording relay Y-2 is actuated by an outoput $\overline{Q}$ of the flip-flop FF-3. The ON state of a contact y2-1 of the recording relay Y-2 drives the known recording device 7 for driving the incoming message tape, so that the mode of the automatic telephone answering device is switched to record the caller's message.

In the above-described embodiment, the recording device 7 is driven by the specific signal 103, comprising the speed calling signal. With this configuration, a switching signal or the so-called "beep" tones for indicating switching from the outgoing message tape to the incoming message tape used in conventional automatic telephone answering devicees may be omitted.

In this manner, the recording flip-flop FF-3 is set and the capacitor C10 connected to a terminal D of the flip-flop FF-4 is charged in response to the output Q of high level through the resistor R10. The capacitor C10 thus stores information indicating that the incoming message tape has been driven. On the other hand, while the caller is recording his message on the incoming message tape, the outgoing message tape T-1. When the conductive tab 101 attached to the end point of the tape T-1 makes short-circuit of the electrode CP after one cycle, the flip-flop FF-2 is reset through terminals b and c of a NOR gate G-1 for stopping the travel of the outgoing message tape. Note that if the outgoing message tape does not comprise an endless loop but a finite length of tape, the tape must be rewound to the starting point by a known method after reproducing the speed calling signal. Sequentially, when the caller finishes recording his message and hangs up the receiver, a momentary release pulse generated onto the telephone line is supplied to the momentary release circuit through the line transformer LT, that is, the capacitor C2 and the resistor R3, to turn on the transistor TR-1. As a result, the flip-flop FF-1 is reset through the AND gate G-3 and a NOR gate G-2, the relay Y-1 is restored to disengage the loop circuit, and the flip-flop FF-3 and the counter 6 are reset. Furthermore, since the output $\overline{Q}$ of the flip-flop FF-1 is supplied to a clock terminal C of the flip-flop FF-4 which serves as means for reengaging the loop circuit, the flip-flop FF-4 is set and the output $\overline{Q}$ and the output Q thereof go low and high, respectively. Under this condition, in about one second, the relay Y-3 is actuated by a delay circuit of a resistor R11 and a capacitor C11 through the inverter G-14. The contact y3-1 of the relay Y-3 reengages a loop circuit. The dial tone transferred from the telephone exchange is supplied to the dial tone detecting circuit 8 through the line transformer LT and an amplifier AMP-3. The dial tone detecting circuit 8 functions in the same manner as the signal sound detecting circuit 5 described before. Namely, an input to a terminal a of the NAND gate G-13 goes low in reponse to the dial tones. Since a terminal b of the NAND gate G-13 receives the output $\overline{Q}$ from the flip-flop FF-4, the terminal b is at low level. Accordingly, a terminal c of the NAND gate G-13 goes high and sets the flip-flop FF-2 through terminals b and c of the OR gate G-10 and the differentiation circuit 2. The motor M is then turned on to drive the outgoing message tape T-1 shown in FIG. 1. The message 102 on the tape may be reproduced back from its starting point and the reproduced sound may be delivered onto the telephone line. However, in this case, the loop circuit is reengaged only in response to a command made by the device. Thus, the message 102 on the outgoing message tape T-1 is reproduced to be superimposed on the dial tones. Since the terminal b of the NAND gate G-5 goes low by the output $\overline{Q}$ from the flip-flop FF-4, the counter 6 does not perform counting in response to the specific signal or speed calling signal 103. Only the message 102 on the outgoing message tape T-1 is reproduced, and the message 102 with the specific signal or speed calling signal 103 is delivered onto the telephone lines. However, the telephone exchange neglects the prerecorded message 102 and first of all reacts in response to the speed calling signal 103 which is generated within at least $t_1$ seconds (different in various countries) before the busy signal is transmitted from a station and after the loop circuit is reengaged. The dial tones stop and a selected telephone number (the dial is mainly set to a telephone number where the subscriber can be reached) is called up. When the subscriber picks up the receiver in response to the ringing, he may not be able to guess a caller since the message of the outgoing message tape T-1 is not heard. Soon white noise of the blank portion 104 of the tape or the like is heard and the subscriber realizes that he is being paged by the automatic telephone answering device. On realizing that, the subscriber hangs up the receiver, and calls up the device again for remote-listening to the caller's (or a customer's) message recorded on the incoming message tape of the conventional device as needed.

In the above-described operation, the loop circuit is reengaged by the relay Y-3 which serves as means for reengaging a loop circuit of the device of the present invention. The reengagement is maintained by the timer 9. As a result, after a predetermined length of time (e.g., thirty seconds) preset in the timer 9 has elapsed, the flop-flop FF-4 of the reengaged loop cirucit is reset through terminals b and c of the NOR gate G-11, the relay Y-3 is restored by the output from the flip-flop FF-4, and the automatic telephone answering device of the present invention is restored to the standby mode, thus enabling the reception of another call.

Furthermore, when the test signal of high level or the alarm signal at the time of an emergency is supplied to the terminal TP-1, the automatic signalling function is enabled even if the incoming message tape is not driven. As a result, the telephone answering device can be used in a variety of wide applications, thereby providing excellent industrial applicability. In the above embodiment, a telephone number corresponding to a speed calling signal is recorded in the outgoing message tape. However, the signals sometimes may not be reproduced with as same frequency as recorded one due to wow and flutter which are caused by a tape driving mechanism. When an inexpensive tape drive mechanism is used, the above deviation may result in mulfunction. In this case, the signal recorded on the tape may be used as a trigger signal, and a high-quality oscillator may be used for oscillating a signal having an accurate frequency, thereby transmitting this oscillation signal onto the telephone line. The above technique is also used for generating a beep tone in the general telephone answering device. For example, a trigger signal generated by a contact of the conductor foil 101 can make a precise beep tone (e.g., 1400 cycles) from a built-in oscillator. This modification is deemed to lie within spirit of the present invention. Other changes and modifications may be made within the spirit and scope of the present invention.

What is claimed is:

1. An automatic telephone answering device having an outgoing message tape and an incoming message tape, characterized in that said automatic telephone answering device comprises: an outgoing message tape in which a speed calling signal for dialling a greater length telephone number of a subscriber or a paging signal for paging a remote subscriber followed by prerecorded messages is stored; switching means for switching from said outgoing message tape to said incoming message tape; memory means for storing information indicating that said incoming message tape has been driven; reengaging means for reengaging a loop circuit by said memory means after said automatic telephone answering device is restored to a standby mode; detecting means for detecting a dial tone which is generated after said loop circuit is reengaged; and driving means for driving said outgoing message tape by said dial tone detecting means; whereby a specific signal stored in said outgoing message tape is delivered automatically onto a telephone line.

2. A device according to claim 1, wherein said switching means operates upon detection of said specific signal.

3. A device according to claim 1, including means for restoring said device to the standby mode without driving said incoming message tape when the caller hangs up a receiver while said outgoing message tape is driven, said reengaging means including means for disabling operation of said reengaging means after said device is restored to the standby mode.

4. A device according to claim 1, wherein said reengaging means comprises a timer, and said loop circuit of said device is disengaged when said timer counts to a predetermined count, thus restoring said device to the standby mode.

5. A device according to claim 1, wherein said reengaging means is energized by an external signal received through another input terminal.

* * * * *